United States Patent
Duran

[19]

[11] Patent Number: 5,836,564
[45] Date of Patent: Nov. 17, 1998

[54] FAIL SAFE HOLD OPEN TELESCOPING ROD

[75] Inventor: John A. Duran, Glendodra, Calif.

[73] Assignee: Avibank Mfg., Inc, Burbank, Calif.

[21] Appl. No.: 652,100

[22] Filed: May 23, 1996

[51] Int. Cl.[6] .................................................. A47F 5/01
[52] U.S. Cl. ..................... 248/354.5; 403/377; 403/378; 403/324; 403/321; 24/651
[58] Field of Search ................. 248/354.5, 351, 248/354.1, 273, 398.1; 403/377, 378, 109, 325, 324, 321; 24/652, 651

[56] References Cited

U.S. PATENT DOCUMENTS

| | | | |
|---|---|---|---|
| 2,474,722 | 6/1949 | Blume | 403/324 X |
| 2,620,210 | 12/1952 | Wuster | 403/377 X |
| 3,276,799 | 10/1966 | Moore et al. | 403/316 |
| 3,280,439 | 10/1966 | Mccarthy | 403/325 X |
| 3,306,639 | 2/1967 | Lyon | 403/109 X |
| 3,345,711 | 10/1967 | Mccarthy | 403/321 X |
| 3,356,329 | 12/1967 | Santo | 248/354.5 X |
| 3,362,050 | 1/1968 | Mccarthy | 403/325 X |
| 3,793,685 | 2/1974 | Knecht | 24/651 |
| 4,768,405 | 9/1988 | Nickipuck | 403/325 X |
| 5,367,743 | 11/1994 | Chang | 403/109 X |
| 5,472,254 | 12/1995 | Wander | 403/316 X |
| 5,513,825 | 5/1996 | Gutgsell | 403/109 X |
| 5,567,080 | 10/1996 | Sterlacci | 403/322 |

Primary Examiner—Ramon O. Ramirez
Assistant Examiner—Long Dinh Phan
Attorney, Agent, or Firm—Oppenheimer Wolff & Donnelly LLP

[57] ABSTRACT

A fail safe hold open telescoping rod movable from a retracted to an extended position. A locking member coacts with telescoping tubes of the rod to allow the tubes to be fully extended by pulling the member away from the tubes and locking the same in a retracted position permitting extension of the tubes without need for manually holding the locking member. When the fully extended position is reached, the locking member automatically returns to a lock position holding the tubes in a fully extended position.

12 Claims, 2 Drawing Sheets

U.S. Patent    Nov. 17, 1998    Sheet 1 of 2    5,836,564
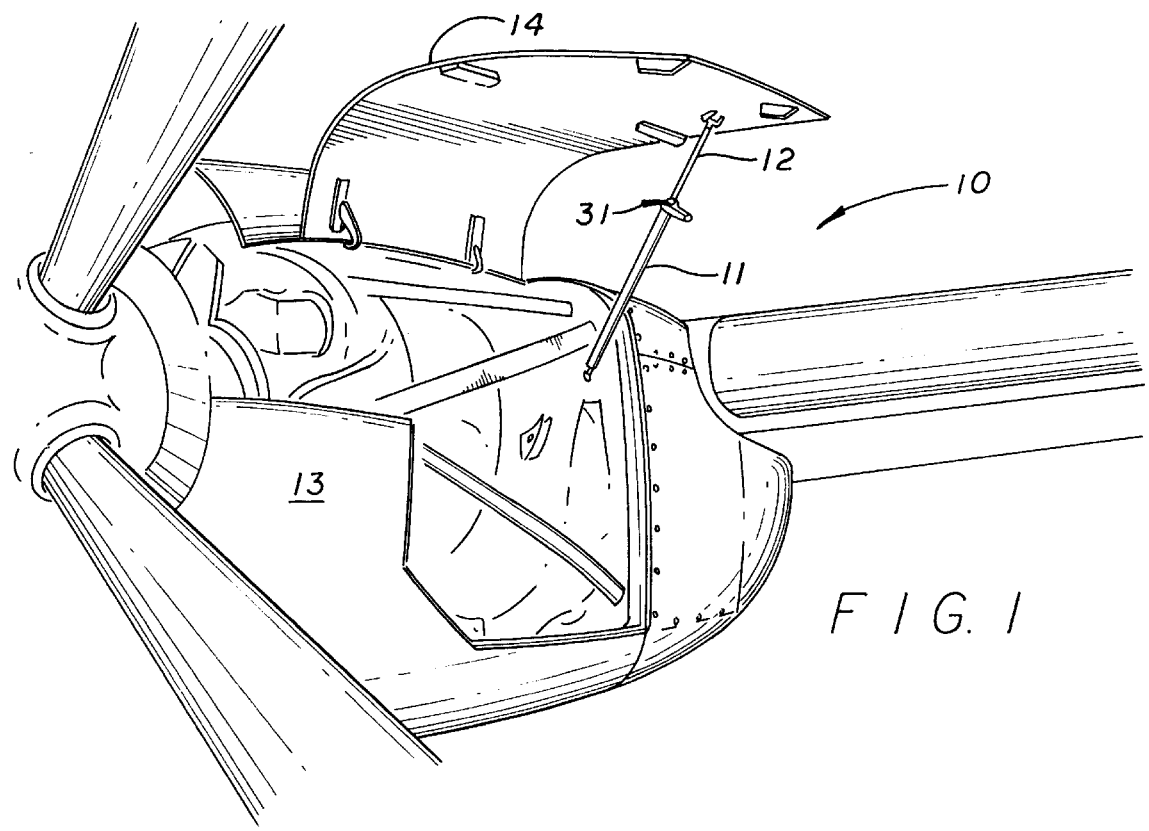
FIG. 1
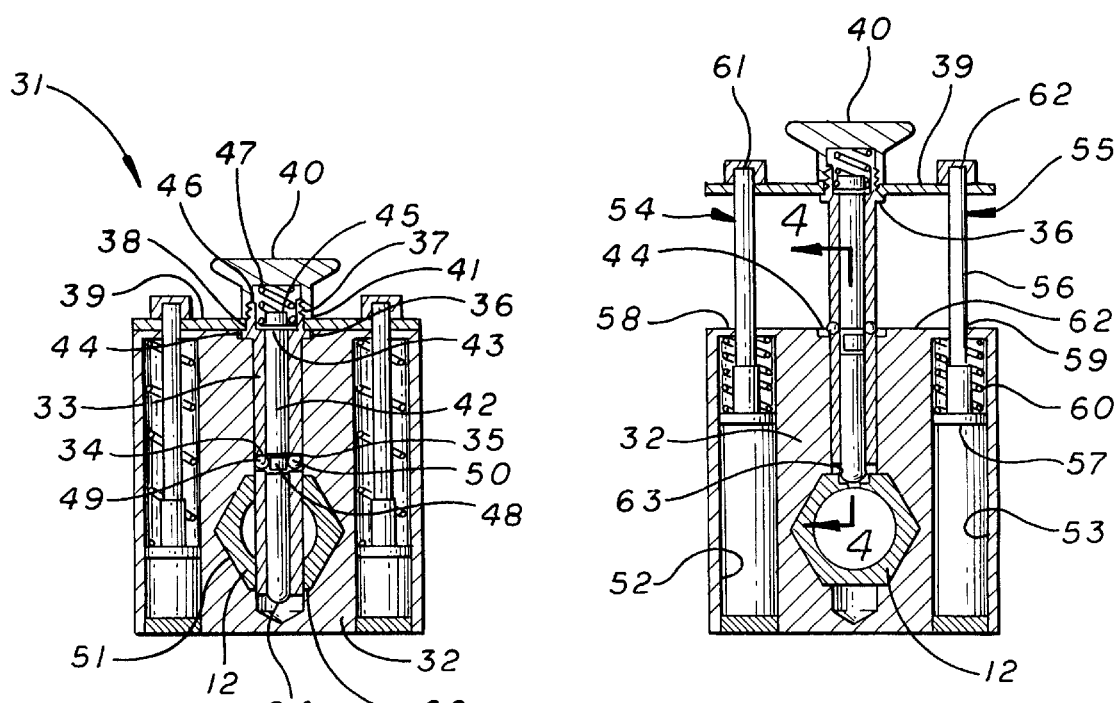
FIG. 2
FIG. 3

FAIL SAFE HOLD OPEN TELESCOPING ROD

BACKGROUND OF THE INVENTION

1. Field of the Invention

The invention relates to telescoping rods; and, more particularly, to a telescoping rod that can be selectively retracted and extended and locked in the extended position.

2. Description of the Prior Art

Telescoping rods or struts are well known in the aircraft art. Such struts are used, for example, to hold aircraft doors in a fully open position. Certain known telescoping struts are locked in a fully extended position by locking pins which must be inserted in place. If the operator forgets to insert the locking pins, or does it improperly, the struts will collapse and damage the aircraft or injure the operator or others.

There is thus a need for a telescoping rod or strut which automatically locks in fully extended position while simultaneously maintaining the locking means out of locking engagement during extension.

SUMMARY OF THE INVENTION

It is an object of this invention to provide a telescoping strut or rod which is self locking in the fully extended position.

It is a further object of this invention to carry out the foregoing object automatically maintaining the locking means our of locking engagement during extension.

It is still further can object of this invention to carry out the foregoing objects where, under compressive load where it is difficult to unlock such struts or rods to retract the same, some of the load acting on the rods or struts can be taken up for ease in unlocking.

These and other objects are preferably accomplished by providing a fail safe hold open telescoping rod movable from a retracted to an extended position. A locking member coacts with telescoping tubes of the rod to allow the tubes to be fully extended by pulling the member away from the tubes and locking or maintaining the same in a retracted position permitting extension of the tubes without need for manually holding the locking member. When the fully extended position is reached, the locking member automatically returns to a locking position holding the tubes in a fully extended and locked position.

BRIEF DESCRIPTION OF THE DRAWING

FIG. 1 is a perspective view of a portion of an aircraft having a fail safe hold open telescoping rod mounted to the door of an aircraft;

FIG. 2 is an elevational sectional view of a portion of the rod of FIG. 1;

FIG. 3 is a view similar to FIG. 2 illustrating operation of the rod of FIGS. 1 and 2;

BRIEF DESCRIPTION OF THE DRAWING

Figure 4:
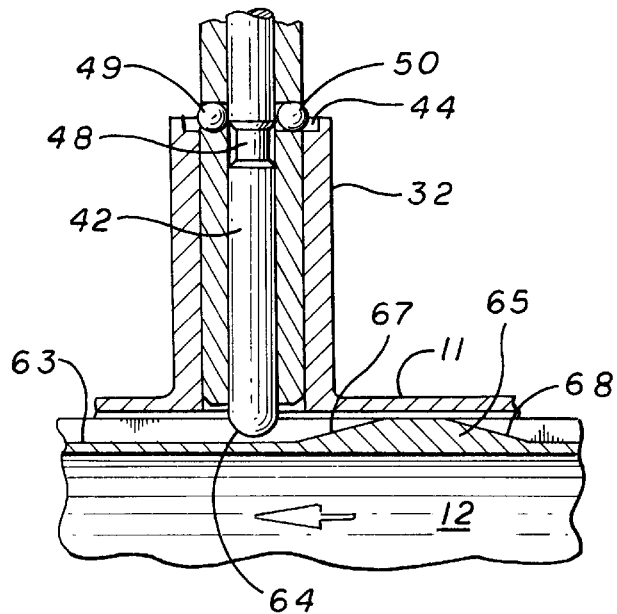
FIG. 4 is a view taken along lines 4—4 of FIG. 3.

Referring now to FIG. 1 of the drawing, a hold open rod 10 in accordance with the teachings of the invention is shown having a first main outer tube 11 and a secondary inner telescoping tube 12. Rod 10 is shown as being part of an aircraft 13 attached at one end thereto and at the other end to a door 14 pivotally mounted on the aircraft 13.

Figure 6:
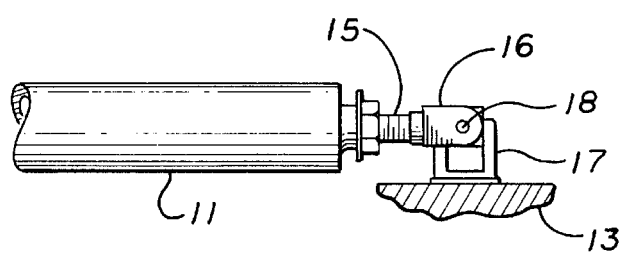
FIG. 6 is an elevational view, partly in section, of the other connecting end of the rod of FIG. 1.

Rod 10 may be attached to door 14 and aircraft 13 in any suitable manner. For example, as seen in FIG. 6, one tube, such as tube 11, may terminate in an integral extension portion 15 having an integral yoke 16 mounted to a bracket 17 by a pivot pin 18. Bracket 17 is mounted on aircraft 13.

The inner tube 12 may be coupled to door 14 by a hook member 19 (FIG. 5) which includes a cavity 20 therein adapted to hook to pin 21 mounted on door 14. A knurled sleeve 22 is slidably mounted on tube 12. Tube 12 has an extension portion 23 having a slot 23' at the terminal end thereof. A slot 25 is provided in portion 23 with a rivet 26 extending through sleeve 22, a bearing 27 mounted within slot 25 and a slot 28 in hook member 19. A similar bearing 29 and rivet 30 pivotally connects hook member 19 to housing 23. A coiled spring 24 is mounted in sleeve 22 normally biasing sleeve 22 to the position shown in solid lines in FIG. 5 wherein hook 19, shown in solid lines, locks onto pin 21. Thus, pulling back sleeve 22 against the bias of spring 24 allows hook member 19 to move to the dotted line position releasing hook concave portion 20 from engagement with pin 21. Of course, releasing sleeve 22 allows it, under its spring bias, to return back to the solid line position shown in FIG. 5.

Referring again to FIG. 1, a hold open means 31 is shown associated with tubes 11, 12. As seen in FIG. 2, means 31 includes a main housing 32 mounted to tube 11 (see FIG. 4) having a sleeve 33 (FIG. 2) mounted therein. Sleeve 33 has a pair of spaced openings 34, 35 therein and an enlarged head 36 at top. A threaded portion 37 integral with head 36 extends through an opening 38 in the upper wall 39 closing off the top of housing 32 and a handle 40, having an integral inner threaded sleeve portion 41, is threaded to threaded portion 37.

A pin 42 is mounted within sleeve 33 and reciprocal therein. Pin 42 has an enlarged head 43 at top disposed in a mating cavity 44 in housing 32. Pin 42 also has an integral terminal end 45 extending above head 43 within cavity 46 in sleeve portion 41. A coiled spring 47 is mounted within cavity 46 normally biasing handle 40 (and, thus, sleeve 33 and pin 42) into the FIG. 2 position.

Pin 42 includes an annular groove 48 therein and a pair of balls 49, 50 are mounted in groove 48 and aforementioned openings 34, 35 in sleeve 33. As seen in FIG. 2, inner tube 12 extends through an opening 51, 32 and may be hexagonal in configuration.

Housing 32 also includes a pair of spaced chambers 52, 53 (FIG. 3) on each side of housing 32. A pair of pistons 54, 55 are reciprocal in each chamber 52, 53. Each piston head 57 is of relatively the same diameter as chambers 52, 53 so that they reciprocate therein.

Piston rods 56 extend through suitable openings 58, 59 in housing 32 and coiled springs 60 are mounted in each chamber 52, 53 between the upper surface 62 of housing 32 and piston head 57, surrounding rod 56, normally biasing pistons 54, 55 to the FIG. 2 position.

The upper terminal ends 61 of each piston rod 56 are receivable in caps 62 integral with wall 39. As seen in FIGS. 2 and 3, wall 39 is retained between sleeve 41 and head 36 so that, when handle 40 is pulled up inwardly from the FIG. 2 to the FIG. 3 position, wall 39, and thus rods 56 press-fit or the like into caps 62 move upwardly against the bias of springs 60.

As seen in FIG. 4, tube 12 has an elongated groove 63 (seen also in FIG. 3) in which the lower end 64 of pin 42 rides in groove 63. Also, a raised portion 65 (FIG. 4) is provided along groove 63 for reasons to be discussed.

Referring now to FIG. 2, the locked position of pin 42 with respect to tube 12 is shown with pin 42 extending into hole 66 through tube 12. Balls 49, 50 in groove 48 are locked in openings 34, 35.

When it is desired to extend tube 12 and pull it up to the FIG. 1 position, handle 40 is grasped and pulled upwardly against the bias of springs 60 thus also pulling upwardly sleeve 33 (due to the coaction with balls 49, 50) and also pulling pistons 54, 55 upwardly as seen in FIG. 3. Balls 49, 50 enter cavity 44 and the lowermost end 64 of pin 42 enters groove 63 in tube 12 (see also FIG. 4). Tube 12 can now be extended out of telescoping engagement with tube 11 in the direction of the arrow in FIG. 4 with end 64 riding in groove 63. Spring 47 serves to bias pin 42 downwardly and retain the same in groove 63.

Figure 4A:
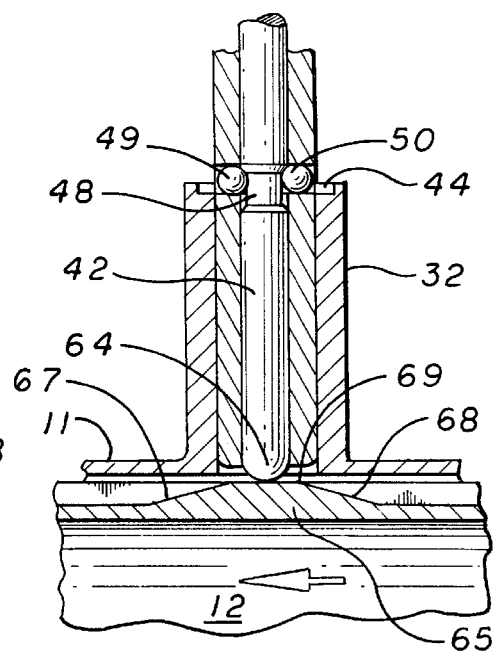
FIGS. 4A and 4B are views similar to FIG. 4 illustrating further operation of the locking means of the rod of FIGS. 1 to 4.

Tube 12 is extended in the direction of the arrow in FIG. 4 until pin end 64 abuts against raised portion 65. The sides 67, 68 thereof are tapered, as seen in FIG. 4A, so that pin end 64 goes up side 67 and reaches the apex 69. At the same time, balls 49, 50 enter groove 48 thus locking pin 42 in the FIG. 4A position. Springs 60 and 47 are of course biasing pin 42 downwardly.

As tube 12 is continued to be pulled in the direction of the arrow in FIG. 4A, pin end 64 rides over raised portion 65 (FIG. 4B) until pin 42 reaches the hole 70 through tube 12 (similar to hole 66) adjacent the terminal or fully extended position of tube 12. Springs 60 and 47 bias pin end 64 down into hole 70.

Figure 4B:
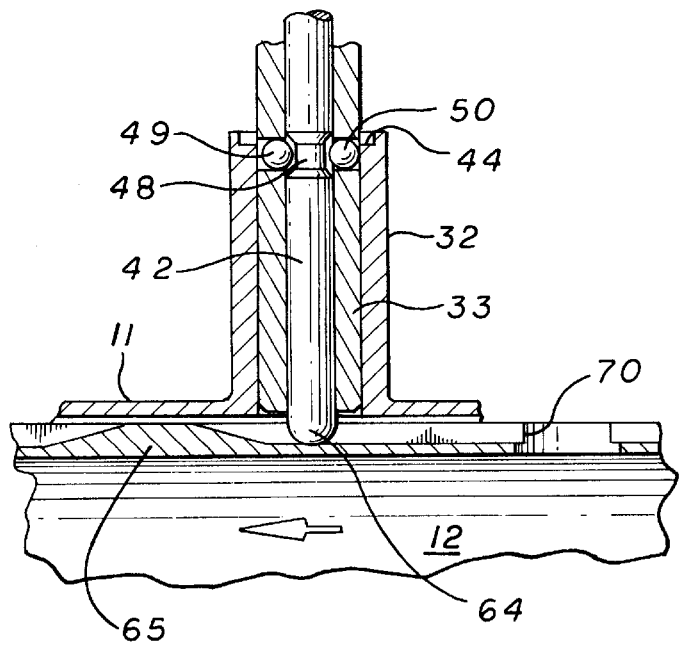

It can be seen that, by pulling upwardly on handle 40, balls 49, 50 lock pin 42 in a hold out position. When pin end 64 rides over raised portion 65, the pin 42 is forced upwardly (FIG. 4A) releasing balls 49, 50 but springs 47, 60 force pin 42 downwardly (FIG. 4B). Pin end 64 now snaps into hole 70 in the fully extended position. (identical to the view shown in FIG. 2).

Although a pair of telescoping tubes 11, 12 are disclosed, obviously a plurality of such tubes may be provided. Also, the use of the invention is illustrated in conjunction with the door of an aircraft, obviously rod 10 can be used in a variety of applications.

Figure 5:
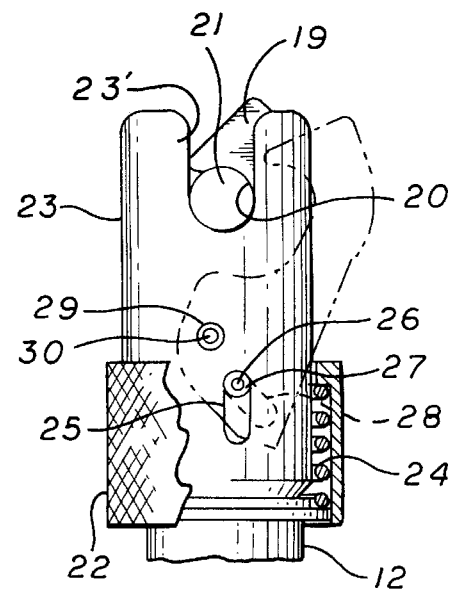
FIG. 5 is an elevational view, partly in section, of one connecting end of the rod of FIG. 1.

Since, under compression load, it is difficult to unlock such rods or struts when in the fully extended position, as shown in FIG. 1, a double safety mechanism is provided by use of the automatic latching mechanism shown in FIG. 5 and herein described. Pulling back on collar 22, due to the slots 25, 28, takes up some of the load allowing the locking means of FIGS. 2 to 4 to be unlocked.

It can be seen that there is described a fail safe hold open telescoping rod or strut which can be operated with one hand to extend the same, then automatically locks in fully extended position. The rod can then be quickly and easily unlocked to retract the telescoping tubes. Although a preferred embodiment of the invention is disclosed, variations thereof may occur to an artisan and the scope of the invention should only be limited by the scope of the appended claims.

I claim:

1. A fail safe hold open rod comprising:
   at least a pair of telescoping tubes, one of said tubes being disposed inside of the other and movable from a fully retracted position to a fully extending position; and
   locking means associated with said tubes normally spring biased into a position locking one of said tubes with respect to the other, said locking means further including hold open means for holding said locking means away from locking engagement with said tubes during extension of one tube with respect to the other, said locking means including a first pair of vertically aligned holes in said tubes, said locking means further including a locking pin movable from a first position into said aligned holes to a second position out of engagement with said aligned holes, said locking means also including biasing means associated with said pin normally biasing said pin toward said holes, said locking means further including a housing mounted to one of said tubes, said pin being centrally mounted in said housing, and biasing means disposed on each side of said pin and coupled thereto normally biasing said pin toward said holes, said hold open means including a groove about the periphery of said pin, at least one ball member disposed in said groove, said pin being reciprocal within a sleeve and movable therewith, said sleeve having at least one opening through which said ball extends when said locking means is in a locking position with respect to said tubes, said housing having an upper end and a cavity therein at the upper end thereof surrounding said sleeve, said ball being adapted to enter said cavity when said pin is moved out of engagement with said holes preventing said sleeve from moving toward said holes.

2. In the rod of claim 1 wherein said inner tube has an upper end and including a longitudinally extending groove in said inner tube along the upper end thereof, said pin riding in said groove when said pin is in non-locking engagement with respect to said holes.

3. In the rod of claim 2 including a ramp disposed along said groove, said ramp having a first inclined surface leading to a plateau and a second inclined surface leading away from said plateau, said pin being adapted to ride up said first inclined surface to said plateau whereby said ball moves out of engagement in said cavity and said biasing means normally forcing said pin into locking engagement with said holes, moves said pin into locking engagement with a second pair of vertically aligned holes in said tubes when said pin moves off said plateau and down said second inclined surface.

4. In the rod of claim 1 including a quick release hook member mounted to one end of said tubes.

5. In the rod of claim 4 wherein said hook member has a cavity therein for receiving a pin there in thereby retaining said hook member to said pin.

6. In the rod of claim 5 herein said one end of said tube has an extension portion with a slot at the terminal end thereof, said hook member being pivotally mounted to said extension portion with its cavity normally disposed within said slot in said portion.

7. In the rod of claim 6 wherein a knurled sleeve is mounted to said extension portion movable from a first position away from said hook member to a second position abutting against said hook member.

8. In the rod of claim 7 wherein said sleeve has an elongated slot therein, said elongated slot being coaxial with an elongated slot in said hook member, and a connecting member coupling said sleeve to said extension portion and extending through both of said elongated slots.

9. In the rod of claim 8 wherein said sleeve is normally spring biased to said second position.

10. A fail safe hold open rod comprising:
    at least a pair of telescoping tubes, one of said tubes being disposed inside of the other and movable from a fully retracted position to a fully extending hold out position;

automatic locking means associated with said tubes normally spring biased into a position locking one of said tubes with respect to the other, said locking means being adapted to release one of said tubes from locking engagement to the other, thereby allowing said one tube to be extended with respect to the other and further including hold open means for holding said locking means away from locking engagement with said tubes during extension of said the of said tubes with respect to the other, then automatically moving into a locking position within said one of said tubes reaches its hold out position;

said locking means including a first pair of vertically aligned holes in said tubes, said locking means further including a locking pin movable from a first position into said aligned holes to a second position out of engagement with said aligned holes, and a housing mounted to one of said tubes, said pin being centrally mounted in said housing, and biasing means disposed on each side of said pin and coupled thereto normally biasing said pin toward said holes; and said hold open means including a groove about the periphery of said pin, at least one ball member disposed in said groove, said pin being reciprocal within a sleeve and movable therewith, said sleeve having at least one opening through which said ball extends when said locking means is in a locking position with respect to said tubes, said housing having an upper end and a cavity therein at the upper end thereof surrounding said sleeve, said ball being adapted to enter said cavity when said pin is moved out of engagement with said holes preventing said sleeve from moving toward said holes.

11. In the rod of claim 10 wherein said inner tube has an upper end and including a longitudinally extending groove in said inner tube along the upper end thereof, said pin riding in said groove when said pin is in non-locking engagement with respect to said holes.

12. In the rod of claim 11 including a ramp disposed along said groove, said ramp having a first inclined surface leading to a plateau and a second inclined surface leading away from said plateau, said pin being adapted to ride up said first inclined surface to said plateau whereby said ball moves out of engagement in said cavity and said biasing means normally forcing said pin into locking engagement with said holes, moves said pin into locking engagement with a second pair of vertically aligned holes in said tubes when said pin moves off said plateau and down said second inclined surface.

* * * * *